(12) United States Patent
Schapeler et al.

(10) Patent No.: US 8,585,007 B2
(45) Date of Patent: Nov. 19, 2013

(54) VALVE OPERATED BY ITS OWN MEDIUM

(75) Inventors: Dirk Schapeler, Mountain View, CA (US); Torsten Feller, Wuppertal (DE); Karin Clauberg, Solingen (DE); Andreas Jahr, Neuss (DE)

(73) Assignee: Bayer Intellectual Property, GmbH, Monheim (DE)

( * ) Notice: Subject to any disclaimer, the term of this patent is extended or adjusted under 35 U.S.C. 154(b) by 0 days.

(21) Appl. No.: 13/550,905

(22) Filed: Jul. 17, 2012

(65) Prior Publication Data

US 2013/0037732 A1 Feb. 14, 2013

(30) Foreign Application Priority Data

Jul. 20, 2011 (EP) ..................................... 11174694

(51) Int. Cl.
*F16K 31/126* (2006.01)
*F16K 31/02* (2006.01)

(52) U.S. Cl.
USPC .................. 251/30.04; 251/30.01; 251/30.05; 251/129.06

(58) Field of Classification Search
USPC .......... 251/30.01, 30.02, 30.03, 30.04, 30.05, 251/129.06
See application file for complete search history.

(56) References Cited

U.S. PATENT DOCUMENTS

| 3,821,967 | A | * | 7/1974 | Sturman et al. | 137/624.15 |
| 4,715,396 | A | * | 12/1987 | Fox | 137/82 |
| 4,787,411 | A | | 11/1988 | Moldenhauer | |
| 4,793,588 | A | * | 12/1988 | Laverty, Jr. | 251/30.03 |
| 4,971,287 | A | * | 11/1990 | Shaw | 251/30.05 |
| 6,457,697 | B1 | * | 10/2002 | Kolze | 251/30.03 |
| 7,320,457 | B2 | | 1/2008 | Heim et al. | |
| 7,690,622 | B2 | * | 4/2010 | Ito et al. | 251/30.02 |
| 7,703,740 | B1 | * | 4/2010 | Franklin | 251/30.03 |
| 7,703,742 | B2 | | 4/2010 | Heim et al. | |
| 2008/0185541 | A1 | * | 8/2008 | Ukpai et al. | 251/11 |

FOREIGN PATENT DOCUMENTS

WO 03107523 12/2003

* cited by examiner

*Primary Examiner* — John K Fristoe, Jr.
*Assistant Examiner* — Daphne M Barry
(74) *Attorney, Agent, or Firm* — John E. Mrozinski, Jr.

(57) ABSTRACT

The invention relates to a valve comprising a valve housing having a valve inlet and outlet, a valve seat arranged in the direction of flow of the fluid between the valve inlet and outlet, a closure means which is movably arranged in the valve housing, and has a first side and a second side, wherein the closure means closes off the valve seat tightly when the valve is in the closed state, a balancing opening for producing a pressure compensation between the first side and the second side of the closure means, and at least one control actuator, wherein the control actuator closes off the balancing opening of the closure means in a closed position and frees the balancing opening of the closure means in an open position so that the closure means frees the valve seat as a result of a pressure compensation via the balancing opening.

9 Claims, 5 Drawing Sheets

VALVE OPERATED BY ITS OWN MEDIUM

FIELD OF THE INVENTION

The invention relates to a valve for a fluid, operated by its own medium, comprising a valve housing having a valve inlet and a valve outlet, a valve seat arranged in the direction of flow of the fluid between the valve inlet and the valve outlet, a closure means which is movably arranged in the valve housing and has a first side and a second side, wherein the closure means closes off the valve seat tightly when the valve is in the closed state, a balancing opening for producing a pressure compensation between the first side and the second side of the closure means, and at least one control actuator, wherein the control actuator closes off the balancing opening of the closure means in a closed position and frees the balancing opening of the closure means in an open position so that the closure means frees the valve seat as a result of a pressure compensation via the balancing opening.

BACKGROUND OF THE INVENTION

Valves operated by their own medium have long been known in the prior art. A typical valve of the type indicated above is described in DE-OS 36 42 669 A1. The valve described in the above publication comprises an electromagnetic control actuator, the armature of which, which is surrounded by a coil, closes off the relief bore in the rest state and frees it on actuation of the control actuator.

In valves of the above type, the hysteresis behaviour of the electromagnetic control actuator is regularly a problem, which during operation leads to a change in the positioning accuracy of the control actuator, with the result that the opening and closing behavior of the valve is no longer completely controllable. A further disadvantage of such valves is that the electromagnetic control actuator that is used significantly increases the weight of the valve structure and the space required thereby.

SUMMARY OF THE INVENTION

The present invention, therefore provides an improved valve, operated by its own medium, of the type aforementioned, which is distinguished by a very precise opening and closing behavior even over long operating periods, as well as by a simple construction and a compact structural form.

This achieved according to the invention by a valve, operated by its own medium, in that the at least one control actuator is in the form of at least one electroactive polymer actuator, wherein the balancing opening can be closed off by a blocking element which can be operated by means of the at least one electroactive polymer actuator and wherein the blocking element is formed by a sliding bearing having a sliding bearing pin and a sliding bearing bush, wherein the sliding bearing pin can be pushed into the sliding bearing bush by means of the at least one electroactive polymer actuator and wherein the sliding bearing pin and the sliding bearing bush each have a through-opening in their lateral surface so that, when the sliding bearing pin is pushed into the sliding bearing bush, the through-openings are aligned with one another and with the balancing opening and free the balancing opening.

BRIEF DESCRIPTION OF THE FIGURES

The present invention will now be described for purposes of illustration and not limitation in conjunction with the figures, wherein.

DETAILED DESCRIPTION OF THE INVENTION

Figure 1:
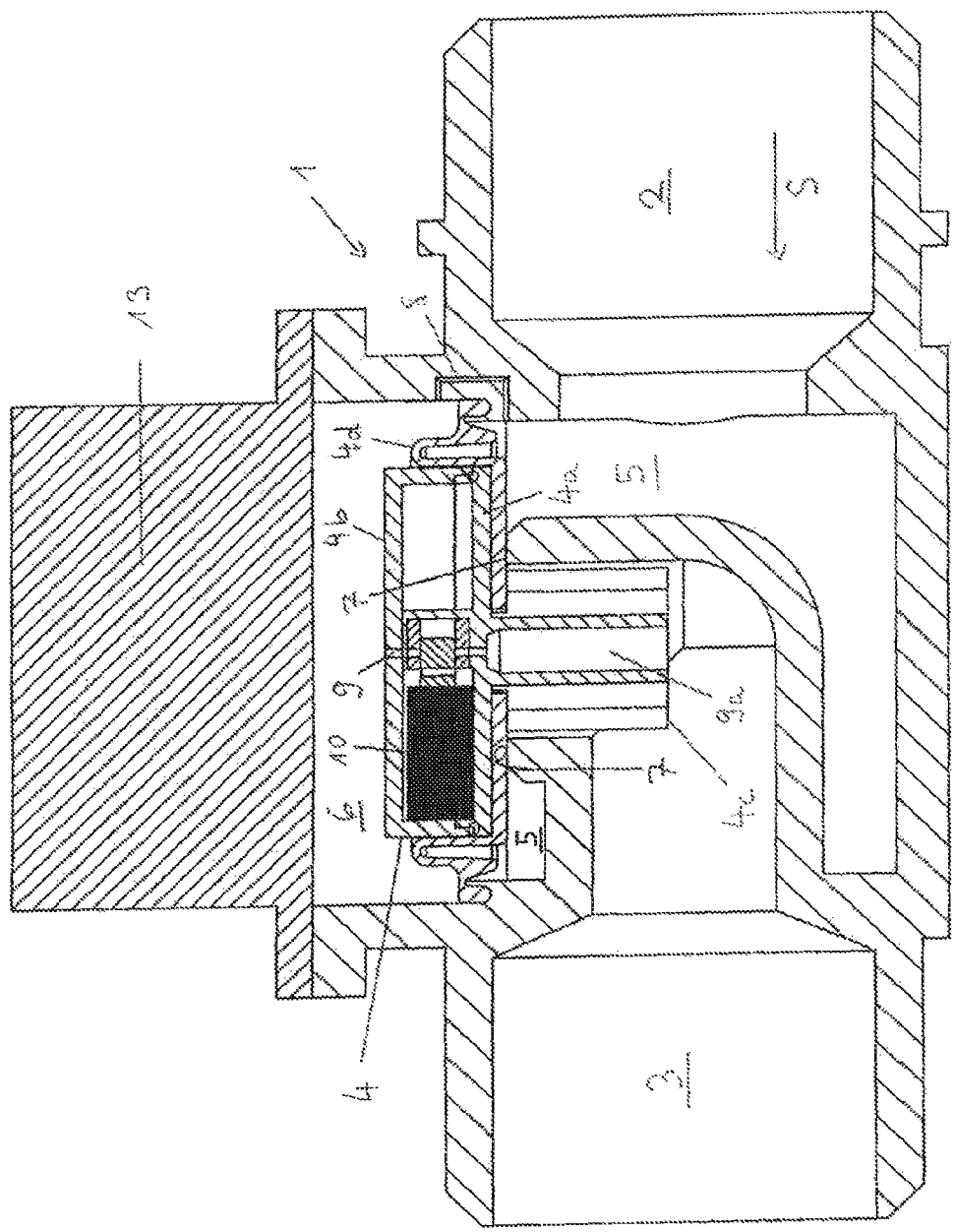
FIG. 1 shows a first embodiment, in longitudinal section, of a valve, operated by its own medium, having an electroactive polymer actuator as control actuator.

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about."

Electroactive polymer actuators preferably comprise one or more layers of electroactive polymers provided on both sides with electrodes. When an electric signal, for example an electric voltage, is applied to the electrodes, an electric field forms between them, the oppositely charged electrodes attracting one another. This leads to a pressure being exerted on the electroactive polymer layer. As a result, the thickness of the polymer layer (Z direction) is reduced, the layer expanding superficially (X and Y direction) owing to the volume constancy of the elastomer material. Extensible electrode materials are for this purpose applied to the surfaces of the elastomer layer either over the entire surface or in a structured manner. For example, correspondingly flexible electrode materials can be used, that is to say materials which have low rigidity. Examples of flexible materials are elastomers filled with electrically conductive filters, or fluoroethylertepropylene.

The particular advantage of using an electroactive polymer actuator is that, as an electrostatic converter, it does not exhibit any hysteresis behavior at all, even over long periods of time, but converts an electric signal into an actuation with an extremely short response time and high positioning accuracy. Furthermore, because of their very small space requirement, electroactive polymer actuators can readily be incorporated into existing valve constructions, and the installation space to be provided in conventional valves for the electromagnetic control actuator, and the weight associated therewith, can substantially be saved. Although the use of electroactive polymer actuators, which include dielectric elastomer actuators, is already known in principle in the art (see, for example, WO 03/107523 A1, U.S. Pat. No. 7,320,457 or U.S. Pat. No. 7,703,742), the advantageous use of electroactive polymer actuators in valves, operated by their own medium, of the type described herein has not been known hitherto.

According to the invention, the balancing opening can be closed off by a blocking element which can be operated by means of the at least one electroactive polymer actuator. Such a blocking element can be of simple construction, for example in the form of an injection-molded plastics part. It also permits specific adaptation to the size and shape of the balancing opening.

The blocking element is further formed according to the invention by a sliding hearing having a sliding bearing pin and a sliding bearing bush, wherein the sliding bearing pin can be pushed into the sliding bearing bush by means of the at least one electroactive polymer actuator and wherein the sliding bearing pin and the sliding bearing bush each have a through-opening in their lateral surface so that, when the sliding bearing pin is pushed into the sliding bearing bush, the through-openings are aligned with one another and with the balancing opening and free the balancing opening, Such a sliding bearing arrangement ensures that the valve according to the invention operates in a trouble- and maintenance-free manner over a long period of time.

With regard to the construction of the valve, it is provided according to an advantageous embodiment of the invention that, in the valve housing, a pressure chamber is provided on the first side of the closure means and a control chamber is provided on the second side of the closure means, wherein the pressure chamber is connected to the valve inlet and is connected to the valve outlet via the valve seat, wherein the control chamber is connected to the valve inlet via a control opening and is connected to the valve outlet via the balancing opening, and wherein the flow cross-section of the control opening is smaller than the flow cross-section of the balancing opening. This construction ensures that the valve operates particularly reliably.

According to an advantageous embodiment of the invention, the at least one electroactive polymer actuator is in the form of a stack actuator having a plurality of electroactive polymer layers stacked one above the other. The resulting actuator force on actuation is increased correspondingly as a result.

The actuation of the electroactive polymer actuator can take place substantially perpendicularly to the extension of the polymer layers. However, the actuation can also take place along the superficial extent of the electroactive polymer layer. In this case, the actuator is a "planar" actuator, in which the actuation correspondingly takes place substantially in the extension plane of the electroactive polymer layer. In the case of such a planar actuator too, a stack actuator having a plurality of electroactive polymer layers stacked one above the other can again be used. The particular advantage is again the increase in the actuator force.

In one embodiment of the valve operated by its own medium according to the invention, the at least one electroactive polymer actuator comprises at least one electroded dielectric elastomer layer, wherein the at least one electroded dielectric elastomer layer preferably contains a polyurethane elastomer, a silicone elastomer and/or an acrylate elastomer. Polyurethane elastomers are particularly preferred. They can be prepared by reaction of a polyisocyanate A) and/or a polyisocyanate prepolymer B) with at least one difunctional compound C) that is reactive towards isocyanate groups, in the presence of a catalyst D) conventional in polyurethane chemistry. Details of the composition of polyurethane elastomers are to be found in the as yet unpublished European patent application 10192847.1, the totality of the content of which is incorporated by reference herein. It has been found that such polyurethane polymers have good elastomeric properties and can be suitable as dielectric elastomers in electromechanical actuator systems. A high maximum expansion is particularly advantageous.

The polyurethane elastomer is preferably a dielectric elastomer having a specific electrical resistivity according to ASTM D 257 of from $\geq 10^{12}$ to $\leq 10^{17}$ Ohm cm. It is further possible for the polyurethane polymer to have a dielectric breakdown field strength according to ASTM 149-97a of from $\geq 50$ V/µm to $\geq 200$ V/µm.

Fillers can regulate the dielectric constant, for example, of the polymer element. The reaction mixture preferably comprises fillers for increasing the dielectric constant, such as fillers having a high dielectric constant. Examples thereof are ceramics fillers, in particular barium titanate, titanium dioxide and piezoelectric ceramics such as quartz or lead zirconate titanate, as well as organic fillers, in particular those having a high electric polarisability, for example phthalocyanines.

In addition, a high dielectric constant can also be achieved by the incorporation of electrically conductive fillers below the percolation threshold. Examples thereof are carbon black, graphite, single-wall or multi-wall carbon nanotubes, electrically conductive polymers such as polythiophenes, polyanilines or polypyrroles, or mixtures thereof. Of particular interest in this context are those carbon black types which exhibit surface passivation and which, at low concentrations below the percolation threshold, therefore increase the dielectric constant but nevertheless do not lead to an increase in the conductivity of the polymer.

According to a further embodiment of the invention, the expansible electrode materials can be applied to the surfaces of the elastomer layer over the entire surface or in a structured manner. As a result, it is possible to activate the electroactive polymer layer locally, that is to say in a space-resolved manner, in order to effect the desired actuation, According to a further embodiment of the invention, the balancing opening and the at least one electroactive polymer actuator are integrated into the closure means. As a result, it is possible to have a particularly compact structural form, the closure means having to be modified only slightly as compared with conventional constructions owing to the very small amount of space required by the electroactive polymer actuator.

According to a further embodiment of the invention, the control opening is in the form of a hole in the valve housing. Alternatively or in addition—in which case there would be more than one control opening it—can also be provided in the closure means.

A further aspect of the present invention relates to the use of an electroactive polymer actuator as a control actuator in a valve operated by its own medium. With regard to the specific advantages, reference is made to the above.

FIG. 1 shows a first embodiment, in longitudinal section, of a valve, operated by its own medium, for a fluid, for example for water, having an electroactive polymer actuator 10 as control actuator, in detail, the valve comprises a housing 1 having a valve inlet 2 and a valve outlet 3 to each of which suitable lines (not shown) can be connected in the conventional manner. The valve further comprises an annular valve seat 7 arranged in the direction of flow S of the fluid between the valve inlet 2 and the valve outlet 3. When the valve is in the closed state, the valve seat 7 is closed off by a closure means 4 movably arranged in the valve housing 1. In detail, the closure means 4 comprises a disc-shaped portion having a first side 4a and a second side 4b as well as a nozzle-like portion 4c which projects perpendicularly and centrally from the first side 4a. The nozzle-like portion 4c extends through the opening surrounded by the annular valve seat 7 and has a central opening 9a, which merges into a closable balancing opening 9 for producing a pressure compensation between the first side 4a and the second side 4b of the closure means 4. The tight fit of the closure means 4 on the valve seat 7 when the valve is in the closed state is further ensured, in a manner known per se, by a diaphragm seal 4d located on the first side 4a of the closure means 4.

Inside the disc-shaped closure means 4 there is arranged an electroactive polymer actuator 10. In the present case, it is in the form of a stack actuator having a plurality of electroactive polymer layers (not shown in detail) which are stacked one above the other and are each electroded on two sides, each polymer layer being formed by a dielectric elastomer layer, which in turn contains in particular a polyurethane elastomer. In accordance with the functional principle of electroactive polymer layers, the electrodes are connected to a power source so that the electrode layers located opposite one another and in contact with the respective electroactive polymer layer assume different charges and consequently attract one another electrostatically, Owing to the elasticity of the electroactive polymer layers, the electrostatic attractive force causes a reduction in the thickness of the electroactive polymer layer and, as a result of the volume constancy a lateral yielding of the material so compressed, which in the present case is used as a planar actuation in the electroactive polymer actuator. With regard to the stacked arrangement of the electroactive polymer layers, it is possible on the one hand to provide adjacent polymer layers with a "common" electrode, which is accordingly in contact with both adjacent electroactive polymer layers. In the case of this construction, which can be achieved with a comparatively low outlay, it will be appreciated that the common electrodes arranged between the individual polymer layers are alternately contacted differently along the thickness extent of the stack of layers so that, when the actuator stack is activated, a +-+-+-+- . . . etc. polarity is correspondingly obtained over the thickness of the stack. It is likewise possible to provide each of the adjacent polymer layers with its own electrode, so that the adjacent polymer layers accordingly do not have a common electrode. Consequently, with appropriate insulation of immediately adjacent electrodes, this gives a greater degree of freedom in terms of the contacting of the individual electrodes.

In order not to impede the lateral expansion of the electroactive polymer, the electrode material that is used must have low rigidity. Examples of flexible materials are elastomers filled with electrically conductive fillers, or fluoroethylenepropylene.

As mentioned, the electroactive polymer actuator 10 in the present case is in the form of a planar actuator, that is to say an actuation here takes place substantially in the extension plane of the electroactive polymer layer. As can be seen in the top view of FIG. 2c, the electroactive polymer actuator 10 fills a segment of a circle within the circular base area of the disc-shaped portion of the closure means 4. As shown in the detail view of FIG. 2a, the electroactive polymer actuator 10 is coupled with a blocking element 11, which is formed by a sliding bearing having a sliding bearing pin 11a and a sliding bearing bush 11b, wherein the sliding bearing pin 11a can be pushed into the sliding bearing bush 11b by means of the electroactive polymer actuator 10. As can further be seen in FIG. 2a, the sliding bearing pin 11a and the sliding bearing bush 11b each have an opening in their lateral surface so that, when the sliding bearing pin 11a is pushed into the sliding bearing bush 11b, the through-openings are aligned with one another and with the balancing opening 9 and free the balancing opening 9.

As is shown in FIG. 1, the closure means 4 separates a pressure chamber 5 connected to the valve inlet 2 from a control chamber 6. The first side 4a of the closure means 4 faces the pressure chamber 5, while the second side 4b of the closure means 4 faces the control chamber 6. The pressure chamber 5 is connected to the control chamber 6 by a control opening 8, which in the present case is in the form of a channel formed in the valve housing 1. It is likewise possible to form the control opening, like the balancing opening 9, in the closure means. Finally, the valve housing further comprises a part-volume 13 in which, for example, electronics for the electroactive polymer actuator 10 can be accommodated.

The valve of FIG. 1 operates as follows:

On the valve inlet side there is fluid under pressure, for example water. This fluid fins both the valve inlet 2 and the pressure chamber 5. The fluid also flows via the control opening 8 into the control chamber 6 and pressurizes it, as a result of which the closure means 4 is pressed via its pressurized second side 4b onto the valve seat 7 and closes it off. The closed position of the valve is hereby defined.

In order to open the valve, the electroactive polymer actuator 10 is activated via the electronics (no(shown) so that, as a planar actuator, it executes an actuation in the plane of its stacked polymer layers. As a result, in the blocking element 11 of the closure means 4, the sliding bearing pin 11a is pushed into the sliding bearing bush 11b until their openings are aligned with the balancing opening 9 and fluid connection is thus established between the control chamber 6 and the valve outlet 3. The pressure above the closure means 4 falls as a result, so that the closure means 4 is lifted, whereby the valve seat 7 is freed and the valve as a whole is opened. The flow cross-section of the balancing opening 9 is preferably smaller than the flow cross-section of the control opening 8 so that, as the fluid flows out of the pressure chamber, fluid cannot flow in an equal amount into the pressure chamber 6 and thus prevent the closure means 4 from being lifted.

Figure 2A:
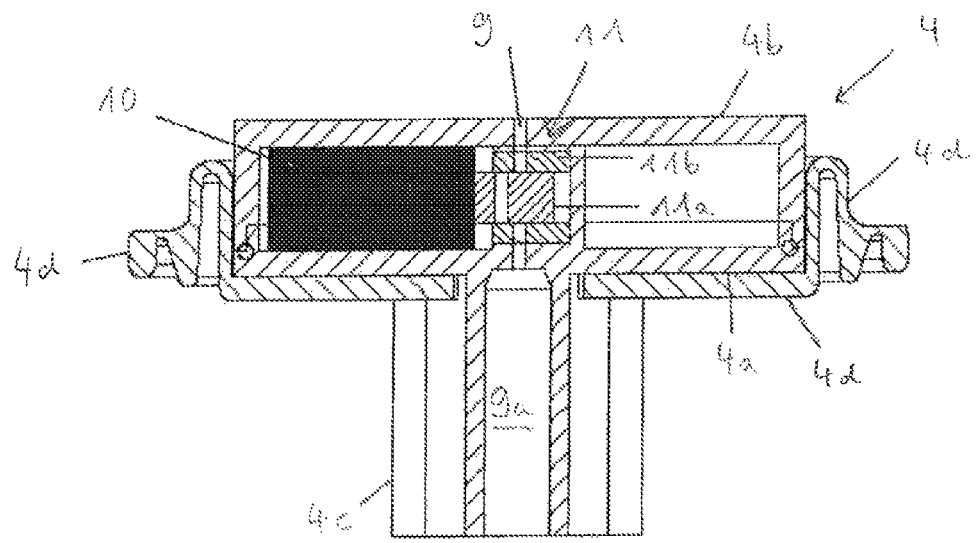
FIGS. 2 a-c illustrate sectional views and a top view of the closure means of the valve of FIG. 1 with the balancing opening closed and open.
Figure 2B:
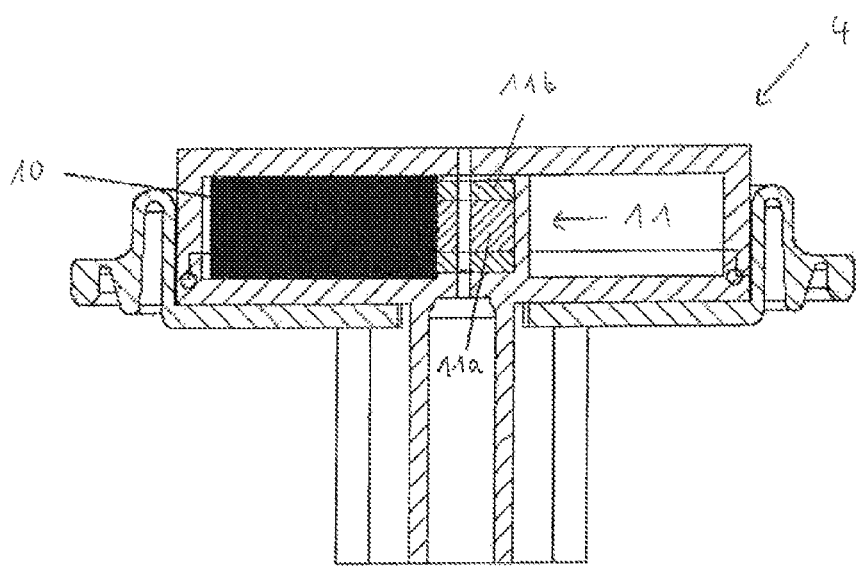
Figure 2C:
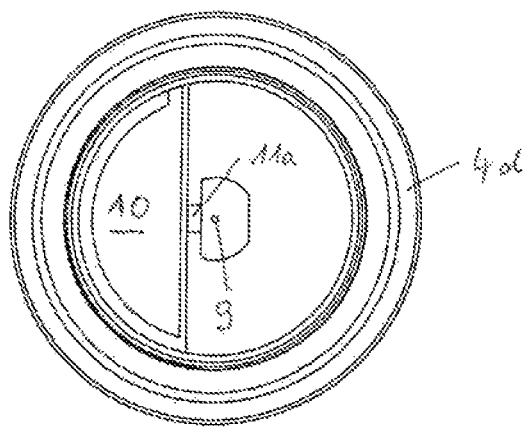

The different actuating positions of the electroactive polymer actuator 10 and accordingly of the blocking element 11 coupled thereto are shown in detail in FIGS. 2a and 2b.

Figure 4:
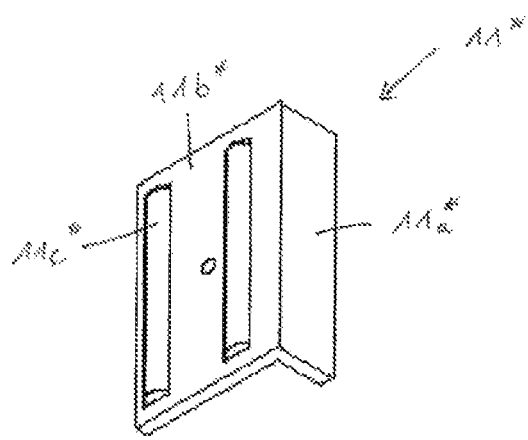
FIG. 4 shows a perspective view of the blocking element of the closure means of FIG. 3.
Figure 3A:
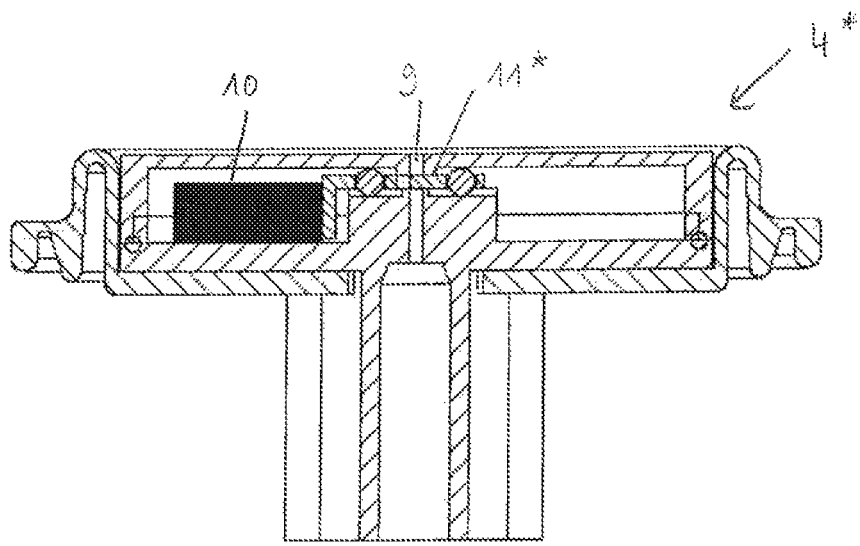
FIGS. 3a and b show a sectional view of a closure means, modified as compared with FIGS. 1 and 2, with the balancing opening closed and open.
Figure 3B:
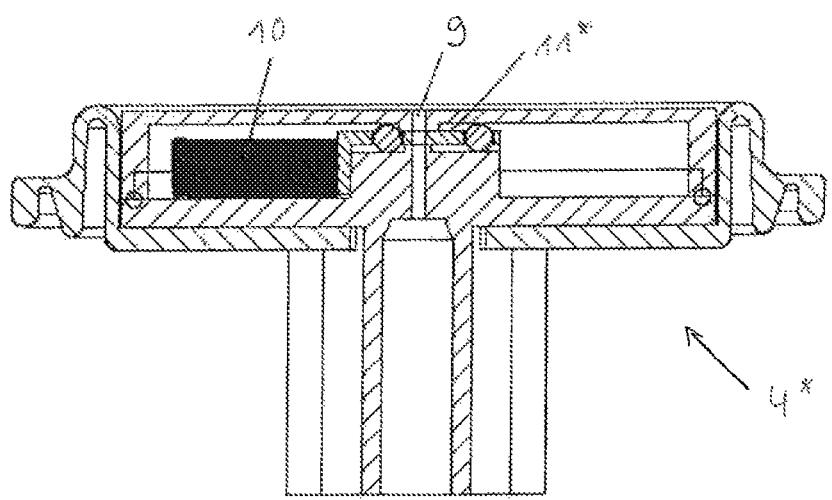

FIGS. 3a and 3b show a closure means 4*, which comprises a blocking element 11* which has been modified as compared with the closure means 4. As can be seen in particular in FIG. 4, the blocking element 11* has a bent shape and is formed by a first, shorter portion 11a*, which abuts the electroactive polymer actuator 10, and a second, longer portion 11b*, which is arranged at a right angle to the first, shorter portion 11a*. The longer portion 11b* acts as a roller bearing cage and comprises two rollers 11c*, which roll with low friction on a corresponding running surface of the housing of the closure means 4*. The electroactive polymer actuator 10 in turn causes the blocking element 11* to be displaced in the closure means 4* in such a manner that an opening in its second, longer portion 11b* formed between the rollers 11c* (see FIGS. 3b and 4) is aligned with the balancing opening 9 so that, for the purpose of opening the valve, a fluid-carrying connection is established between the control chamber 5 and the valve outlet 3. It will be appreciated that the closure means can also be in such a form that the fluid connection is established in the inactive state of the electroactive polymer actuator 10. As can be seen in FIGS. 3a, b, this simply requires a relative displacement of the opening in the longer portion 11b* of the blocking element 11*.

Figure 5A:
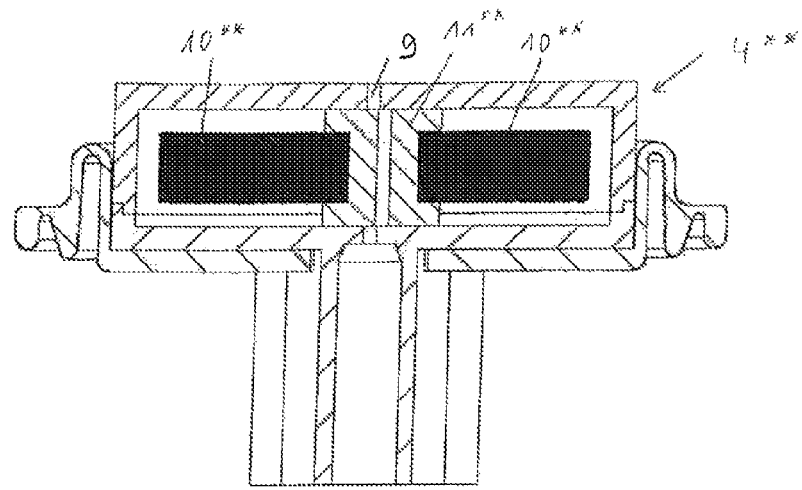
FIGS. 5a-c show sectional views and a top view of a third embodiment of a closure means with the balancing opening closed and open.
Figure 5B:
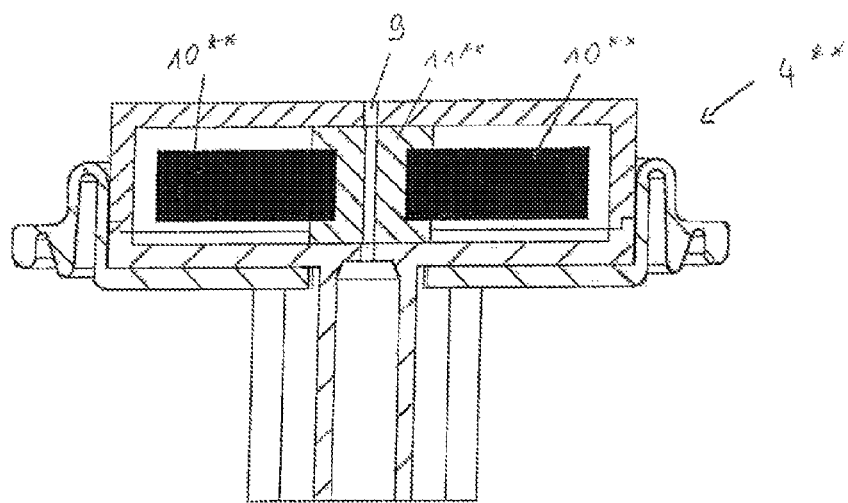
Figure 5C:
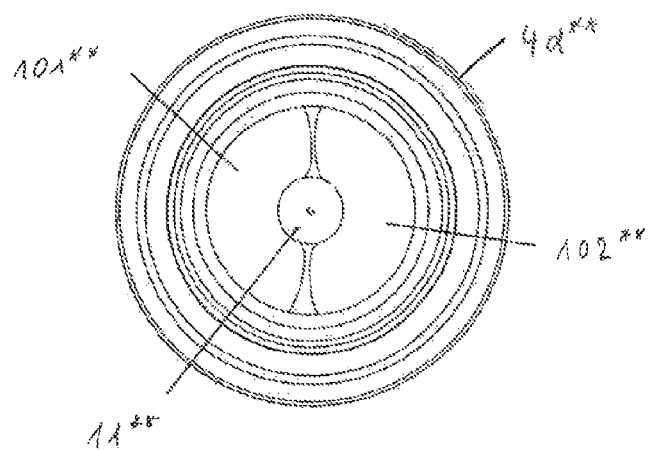

Finally, FIGS. 5a-5c show a third variant of the closure means. This comprises an electroactive polymer stack actuator 10* * which has been modified in terms of its form and in the closure means 4* * surrounds, in an annular manner, an axially open cylinder with radially widened collars at the front ends as blocking element 11* *. On the underside of each polymer layer of the stack of layers of the electroactive polymer actuator 10* *, the electrode is formed over the entire surface (not visible), while it is structured on the respective upper side (see FIG. 5c). It will be appreciated that the electrode on the underside can also be structured, while the electrode on the upper side is formed over the entire surface, that is to say in an annular manner corresponding to the form of the particular electroactive polymer layer. Likewise, both electrodes can also be structured. In the present case, the electrode on the upper side is divided into two electrode portions **101\*\*, 102\*\*, wherein the two electrode portions 101\*\*, 102\*\* surround the axially open cylinder 11\*\*** in a semi-circle.

In order to produce art actuation in the plane of the polymer layers, only the lower electrode as well as one of the two electrode portions **101\*\*, 102\*\* is energized, so that the electroactive polymer layer is activated only locally, namely in the portion between the lower electrode and the actuated upper electrode portion. This has the result that the stack of layers of the electroactive polymer actuator 10\*\* is deformed, that is to say compressed perpendicularly to the superficial extent and at the same time expanded laterally, only at that point, as discussed above. As a result, a lateral movement of the cylinder-shaped blocking element 11\*\*** is effected, the non-activated portion of the stack of polymer layers being compressed laterally.

FIG. 5a shows that the annular electroactive polymer layers of the electroactive polymer actuator **10\*\* are expanded laterally to the left of the blocking element 11\*\*, on that the blocking element 11\*\* moves out of the opening position of the balancing opening 9 and the valve is accordingly closed. In FIG. 5b, the annular electroactive polymer layers of the electroactive polymer actuator 10\*\* are completely non-activated, so that the blocking element 11\*\* remains in the rest position, which in the present case represents the open position of the valve. By correspondingly reconfiguring the arrangement of the blocking element 11\*\* relative to the balancing opening 9**, it is of course also possible to define the closed position of the valve as the normal position.

The foregoing examples of the present invention arc offered for the purpose of illustration and not limitation. It will be apparent to those skilled in the art that the embodiments described herein may be modified or revised in various ways without departing from the spirit and scope of the invention. The scope of the invention is to be measured by the appended claims.

What is claimed is:

1. A valve for a fluid, operated by its own medium, comprising:
    a valve housing having a valve inlet and a valve outlet,
    a valve seat arranged in the direction of flow of the fluid between the valve inlet and the valve outlet,
    a closure means which is movably arranged in the valve housing and has a first side and a second side, wherein the closure means closes off the valve seat tightly when the valve is in the closed state,
    a balancing opening for producing a pressure compensation between the first side and the second side of the closure means, and
    at least one control actuator, wherein the control actuator closes off the balancing opening of the closure means in a closed position and frees the balancing opening of the closure means in an open position so that the closure means frees the valve seat as a result of a pressure compensation via the balancing opening, wherein the at least one control actuator is in the form of at least one electroactive polymer actuator, wherein the balancing opening can be closed off by a blocking element which can be operated by means of the at least one electroactive polymer actuator, and wherein the blocking element is formed by a sliding bearing having a sliding bearing pin and a sliding bearing bush, wherein the sliding bearing pin can be pushed into the sliding bearing bush by means of the at least one electroactive polymer actuator and wherein the sliding bearing pin and the sliding bearing bush each have a through-opening in their lateral surface so that, when the sliding bearing pin is pushed into the sliding bearing bush, the through-openings are aligned with one another and with the balancing opening and free the balancing opening.

2. The valve according to claim 1, wherein in the valve housing, a pressure chamber is provided on the first side of the closure means and a control chamber is provided on the second side of the closure means, wherein the pressure chamber is connected to the valve inlet and is connected to the valve outlet via the valve seat, wherein the control chamber is connected to the valve inlet via a control opening and is connected to the valve outlet via the balancing opening, and wherein the flow cross-section of the control opening is smaller than the flow cross-section of the balancing opening.

3. The valve according to claim 1, wherein the at least one electroactive polymer actuator comprises at least one electroded electroactive polymer layer.

4. The valve according to claim 3, wherein the at least one electroded electroactive polymer layer is a dielectric elastomer layer, wherein the dielectric elastomer layer contains one or more members selected from the group consisting of a polyurethane elastomer, a silicone elastomer and an acrylate elastomer.

5. The valve according to claim 3, wherein the at least one electroactive polymer actuator is in the form of a stack actuator having a plurality of electroactive polymer layers stacked one above the other.

6. The valve according to claim 3, wherein the at least one electroactive polymer actuator is in the form of a planar actuator in which the actuation takes place substantially in the extension plane of the electroactive polymer layer.

7. The valve according to claim 6, wherein the planar actuator has a structured electrode arrangement, so that the electroactive polymer layer can be activated locally in order to effect the actuation.

8. The valve according to claim 1, wherein the balancing opening and the at least one electroactive polymer actuator are integrated into the closure means.

9. The valve according to claim 1, wherein the control opening is formed in the valve housing

\* \* \* \* \*